United States Patent [19]
Wiesner

[11] Patent Number: 5,570,827
[45] Date of Patent: Nov. 5, 1996

[54] HOLSTER

[76] Inventor: Steve A. Wiesner, 200 W. Pleasantview, Hurst, Tex. 76054

[21] Appl. No.: 514,274

[22] Filed: Aug. 11, 1995

[51] Int. Cl.$^6$ ..................................... A45C 1/04
[52] U.S. Cl. ................... 224/587; 224/269; 224/911
[58] Field of Search ..................... 224/676, 677, 224/680, 684, 660, 673, 674, 230, 231, 243, 249, 911, 912, 269, 229, 587, 666, 668; D3/218, 222, 223

[56] References Cited

U.S. PATENT DOCUMENTS

| | | | |
|---|---|---|---|
| D. 280,863 | 10/1985 | Leath | D3/218 |
| D. 287,305 | 12/1986 | Brown | D3/218 |
| 3,118,580 | 1/1964 | Manshel | 224/231 |
| 3,250,448 | 5/1966 | Clark . | |
| 3,300,109 | 1/1967 | Clark . | |
| 3,379,349 | 4/1968 | Hier | 224/911 |
| 3,583,612 | 6/1971 | Theodore | 224/243 |
| 4,022,361 | 5/1977 | Devlin . | |
| 4,479,596 | 10/1984 | Swanson | D3/218 |
| 4,667,374 | 5/1987 | Bianchi . | |
| 4,785,983 | 11/1988 | De Santis | 224/911 |
| 4,966,320 | 10/1990 | DeSantis et al. . | |
| 5,054,670 | 10/1991 | Gallagher | 224/911 |
| 5,054,671 | 10/1991 | Else | 224/911 |
| 5,265,781 | 11/1993 | Nichols . | |

OTHER PUBLICATIONS

Leatherwood Hoster–Specializing in Concealed Carry Summer 1992.

*Primary Examiner*—David J. Walczak
*Assistant Examiner*—Gregory M. Vidovich
*Attorney, Agent, or Firm*—Daniel V. Thompson

[57] ABSTRACT

An improved pistol holster includes a holster body and a pager or a pager-unit attached to the holster body. Bulging of the holster body is minimized by the provision of wings extending forwardly and rearwardly to enhance the stiffness of the holster body.

2 Claims, 2 Drawing Sheets

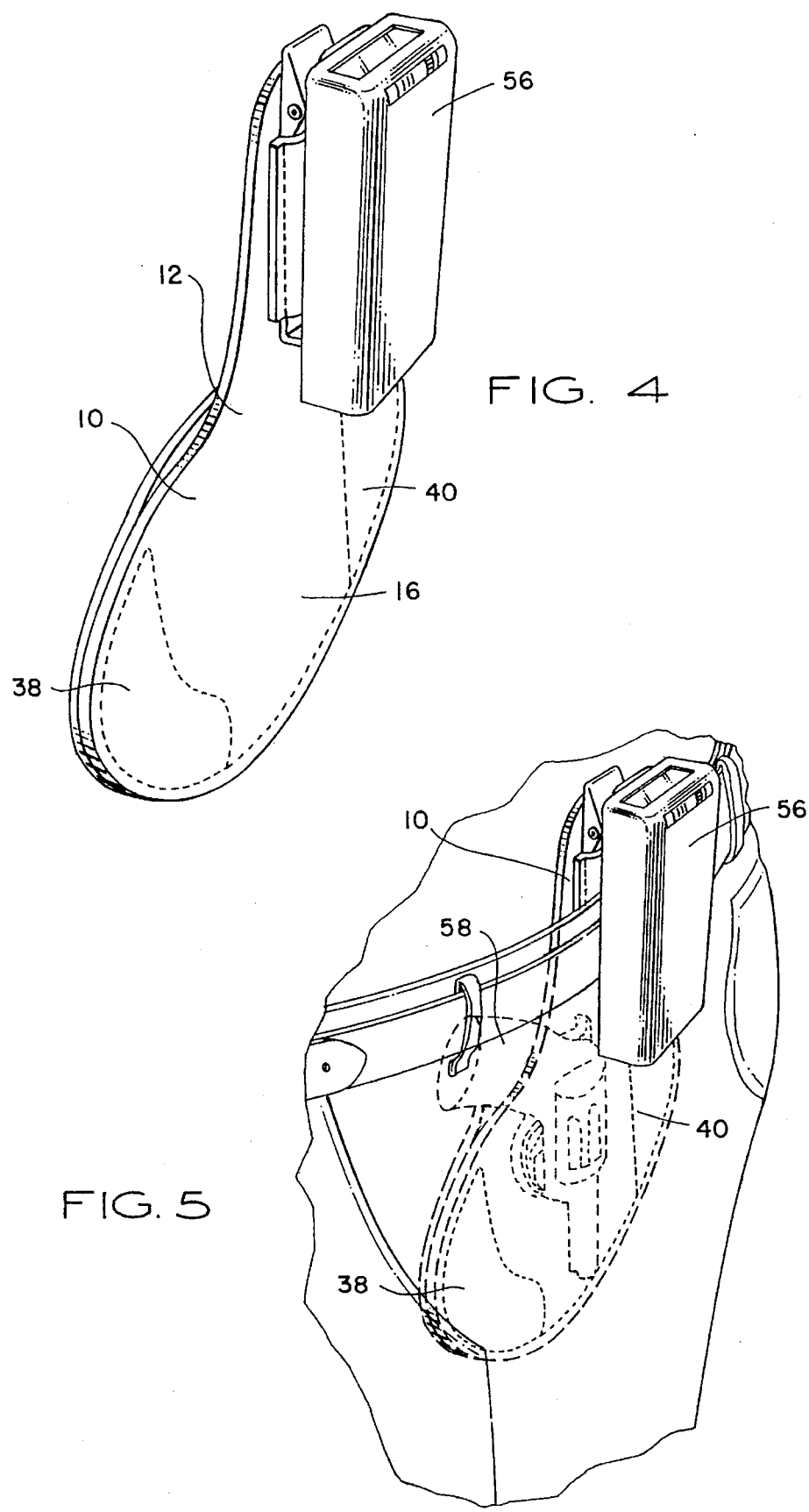

HOLSTER

FIELD OF THE INVENTION

This invention relates to firearms, and more particularly to a pistol holster.

BACKGROUND ART

It is often desirable to carry a pistol in a concealed location on the body of the user. It has long been known to provide a pistol holster that rocks inside the waistband of the user's pants. A drawback of the inside-the-pants pistol holsters in the past has been the observability of the clip that holds the holster to the waistband. The purpose of the concealed pistol holster is defeated if the connecting clip is observable and recognizable from the exterior. Another drawback of the prior inside-the-pants pistol holsters is the appearance of a bulge where the pistol holster is located. Again, the purpose is defeated if an obvious bulge is visible from the exterior of the user.

SUMMARY OF THE INVENTION

The present invention provides an improved pistol holster that disguises the carrying clip by incorporating a pager or pager-like unit attached to the upper portion of the pistol holster. From the exterior, only the pager or pager-unit is visible, which is a common appearance given the popularity of electronic pagers. Another aspect of the invention provides a pistol holster formed of inner and outer layers with portions of the inner and outer layers forming wings extending forwardly and rearwardly. The wings, in combination with the relatively stiff flexible material forming the layers, maximizes the flatness of the holster and thereby minimizes the bulge.

BRIEF DESCRIPTION OF THE DRAWINGS

A more complete understanding of the invention and its advantages will be apparent from the Detailed Description taken in conjunction with the accompanying Drawings, in which:

FIG. 4 is a perspective view of the pistol holster of FIG. 1 with a pager or pager-like unit attached; and FIG. 5 is a view of the pistol holster in use.

DETAILED DESCRIPTION OF THE PREFERRED EMBODIMENT

Figure 1:
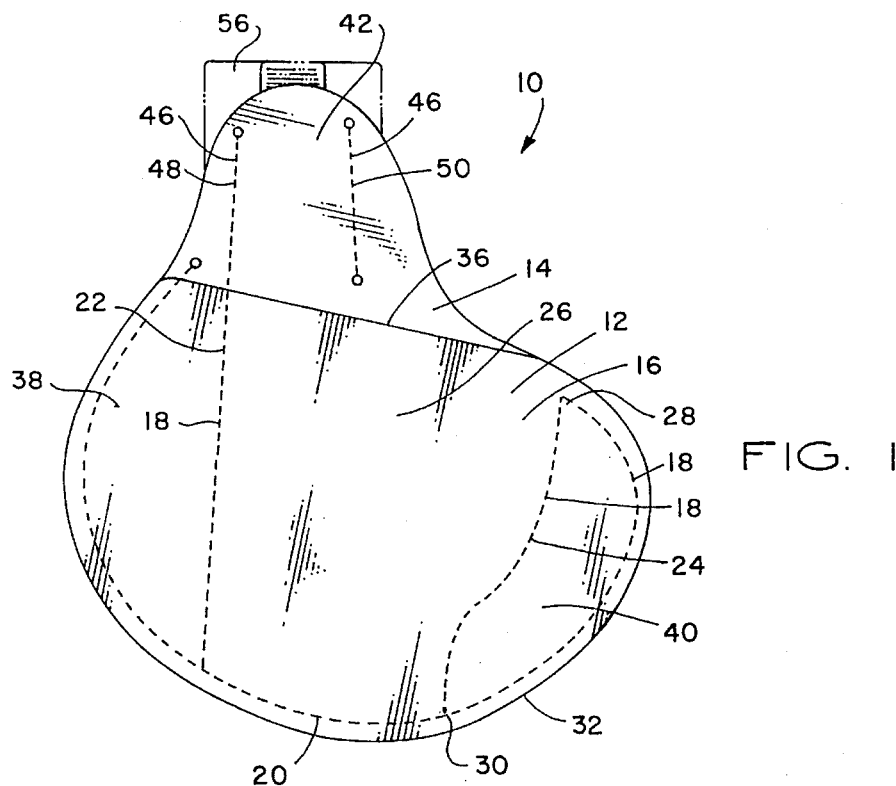
FIG. 1 is a rear view of a pistol holster constructed in accordance with the invention.
Figures 2, 3:
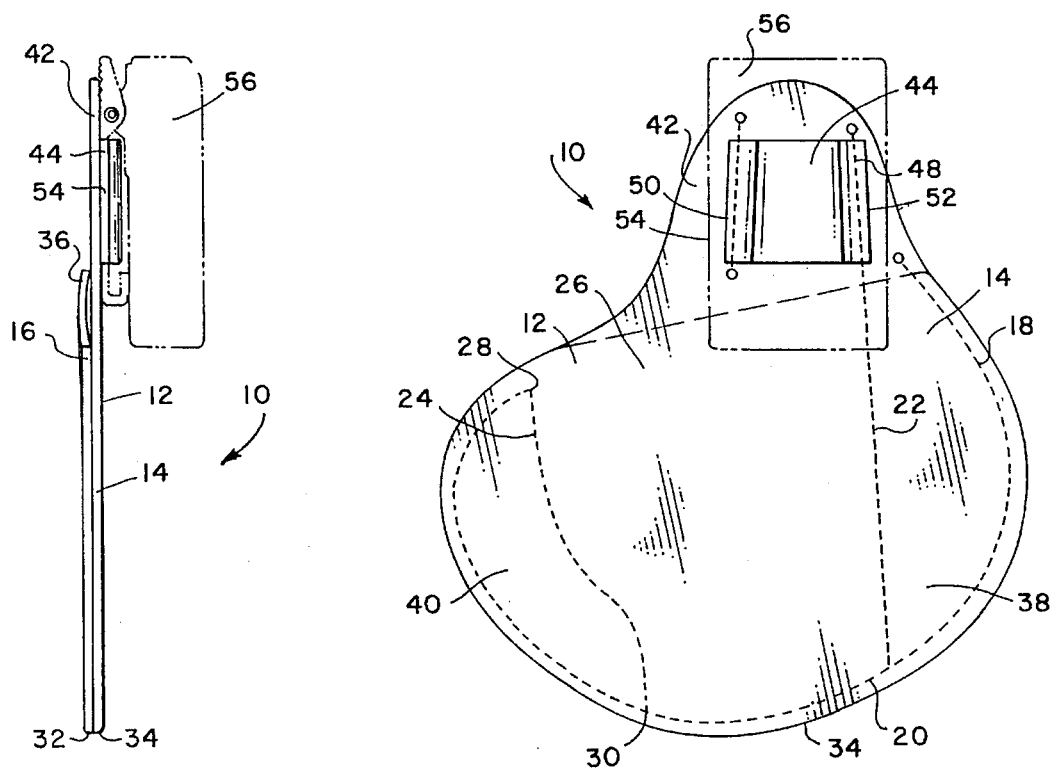
FIG. 2 is a side view of the pistol holster of FIG. 1.
FIG. 3 is a front view of the pistol holster of FIG. 1.

Referring initially to FIGS. 1–3, where like numerals refer to like and corresponding elements, a pistol holster 10 includes a holster body 12. Holster body 12 includes an outer layer 14 formed of a flexible sheet material. In the preferred embodiment, the sheet material of the outer layer 14 is leather, about ⅛ inch thick. Inner layer 16 is also formed of a flexible sheet material, but is leather only about 1/16 of an inch thick.

Inner and outer layers 14 and 16 are joined by connection means 18. In the preferred embodiment, the connection means 18 is stitching through the inner and outer layers 16, 14. The stitching includes a perimeter line 20. The stitching also includes a first interior section of stitching 22, and a second interior section of stitching 24. The first and second interior sections of stitchings 22, 24 are spaced to form a pistol compartment 26 with the inner and outer layers 16, 14. Preferably, the first interior section of stitching 22 is linear, while the second interior section of stitching 24 is curved to be spaced more widely from the first interior section of stitching 22 at a top end 28 and at a bottom end 30.

The inner and outer layers 16, 14 have congruent curved perimeters 32 and 34 below the linear top edge 36 of the inner layer 16. Forward portions of the inner and outer layers 16, 14, located below the inner layer top edge 36 and extending forwardly of the pistol compartment 26 to the perimeters 32, 34, form a forward wing 38. Similarly, rearward portions of the inner and outer layers 16, 14 located below the inner layer top edge 36 and extending rearwardly of the pistol compartment 26 to the perimeters 32, 34, form a rearward wing 40. Preferably, the forward wing has a maximum extension length from first interior section of stitching 22 of about 1.5 inches. In contrast, the rearward wing has a maximum extension length of about 1.0 inch from the second interior section of stitching 22.

The outer layer 14 has a tab 42 extending above the top edge 36 of the inner layer 16. A clip retainer layer 44 is joined to tab 42 opposite the inner layer 16. Clip retainer layer 44 is formed of a flexible sheet material, and like inner layer 16 is preferably leather about 1/16 inch thick.

Clip retainer layer 44 and outer layer 14 are joined by joining means 46. Joining means 46 is preferably stitching through the clip retainer layer 44 and outer layer 14. The joining means includes forward and rearward lines of stitching 48, 50. The forward line of stitching is co-linear with the first interior section of stitching 22 connecting the inner and outer layers, 16, 14 and extending along a forward edge 52 of the clip retainer layer 44. The rearward line of stitching 50 is linear and extends along a rearward edge 54 of the clip retainer 44.

A pager or pager-like unit 56 is attached to the clip retainer 44. It will be recognized that unit 56 may be either a real pager or merely a pager housing serving as a decoy. The cost of the pistol holster will be significantly reduced in the event a decoy pager-like unit is used rather than a pager, however, many users will prefer to use real pagers.

In operation, as shown in FIGS. 4 and 5, pager or pager-like unit 56 is firmly attached to holster body 12. The user then slips holster body 12 inside his or her pants as shown in FIG. 5 with the unit 56 on the exterior. The provision of forward and rearward wings 38, 40 adds increased stiffness to holster body 12. Outer layer 16, being a relatively thick ⅛ inch leather, resists curving induced by pistol 58, and the stiffness is enhanced by wings 38, 40 to provide a smooth unbulging appearance.

Whereas, the present invention has been described with the respect to a specific embodiment thereof, it will be understood that various changes and modifications will be suggested to one skilled in the art, and it is intended to encompass such changes and modifications as fall within the scope of the appended claims.

I claim:

1. A pistol holster, comprising:

a holster body;

the holster body including an outer layer formed of a flexible sheet material;

an inner layer formed of a flexible sheet material;

the inner and outer layers being joined by connection means to form a pistol compartment;

the connection means being stitching through the inner and outer layers, the connection means including a perimeter line of stitching and first and second interior lines of stitching wherein the first and second interior sections of stitching being spaced to form the pistol compartment therebetween with the inner and outer layers and wherein the first interior section of stitching is linear;

a forward portion of the holster body, located below the inner layer top edge and extending forwardly of the pistol compartment and the first interior section of stitching, forming a forward wing;

rearward portions of the holster body, located below the inner layer top edge and extending rearwardly of the pistol compartment and the second interior section of stitching, forming a rearward wing;

with the outer layer having a tab extending above the top edge of the inner layer;

a clip retainer layer joined to the tab opposite the inner layer;

the clip retainer layer formed of a flexible sheet material;

the clip retainer layer and outer layer being joined by joining means;

with the sheet material of the clip retainer layer being about 1/16 inch thick;

the sheet material of the clip retainer layer being leather;

with the joining means being stitching through the clip retainer layer and outer layer;

the joining means including forward and rearward lines of stitching;

with the forward line of stitching being collinear with the first interior section of stitching connecting the inner and outer layers and extending along a forward edge of the clip retainer layer; and the rearward line of stitching being linear and extending along a rearward edge of the clip retainer layer.

2. A pistol holster, comprising:

a holster body;

the holster body including an outer layer formed of a flexible sheet material;

the sheet material of the outer layer being about 1/8 inch thick;

the sheet material of the outer layer being leather;

an inner layer formed of a flexible sheet material;

the sheet material of the inner layer being about 1/16 inch thick;

the sheet material of the inner layer being leather;

the inner and outer layers being joined by connection means;

the connection means being stitching through the inner and outer layers;

the connection means stitching including a perimeter line of stitching;

the connection means stitching including first and second interior sections of stitching;

the first and second interior sections of stitching being spaced to form a pistol compartment therebetween with the inner and outer layers;

the first interior section of stitching being linear;

the second interior section of stitching being curved to be spaced more widely from the first interior section of stitching at a top end than at a bottom end;

the inner and outer layers having congruent, curved perimeters below a linear top edge of the inner layer;

forward portions of the inner and outer layers, located below the inner layer top edge and extending forwardly of the pistol compartment to the perimeters, forming a forward wing;

rearward portions of the inner and outer layers, located below the inner layer top edge and extending rearwardly of the pistol compartment to the perimeters, forming a rearward wing;

the forward wing having a maximum extension length of about 1.5 inches;

the rearward wing having a maximum extension length of about 1.0 inch;

the outer layer having a tab extending above the top edge of the inner layer;

a clip retainer layer joined to the tab opposite the inner layer;

the clip retainer layer formed of a flexible sheet material;

the sheet material of the clip retainer layer being about 1/16 inch thick;

the sheet material of the clip retainer layer being leather;

the clip retainer layer and outer layer being joined by joining means;

the joining means being stitching through the clip retainer layer and outer layer;

the joining means including forward and rearward lines of stitching;

the forward line of stitching being collinear with the first interior section of stitching connecting the inner and outer layers and extending along a forward edge of the clip retainer layer;

the rearward line of stitching being linear and extending along a rearward edge of the clip retainer layer; and one of a pager and pager-like unit attached to the clip retainer layer.

* * * * *